(12) United States Patent
Moody et al.

(10) Patent No.: US 9,347,582 B2
(45) Date of Patent: May 24, 2016

(54) SYSTEM, METHOD, AND APPARATUS FOR OPTIMIZING THE FLOW RATE THROUGH DETENTION AND SURGE FACILITIES

(71) Applicant: THIRSTY DUCK, LP, Trinity, FL (US)

(72) Inventors: Jonathan D. Moody, Hudson, FL (US); Raymond Charles Bellas, New Port Richey, FL (US)

(73) Assignee: THIRSTY DUCK, LP, Trinity, FL (US)

( * ) Notice: Subject to any disclaimer, the term of this patent is extended or adjusted under 35 U.S.C. 154(b) by 0 days.

(21) Appl. No.: 14/459,716

(22) Filed: Aug. 14, 2014

(65) Prior Publication Data

US 2016/0047486 A1 Feb. 18, 2016

(51) Int. Cl.
*E02B 3/00* (2006.01)
*F16K 33/00* (2006.01)

(52) U.S. Cl.
CPC .................................... *F16K 33/00* (2013.01)

(58) Field of Classification Search
USPC ............................ 405/41, 80, 92, 96, 97, 127
See application file for complete search history.

(56) References Cited

U.S. PATENT DOCUMENTS

| | | |
|---|---|---|
| 706,526 A | 8/1902 | Carlisle |
| 930,903 A | 8/1909 | Tucker |
| 1,758,941 A | 5/1930 | Gibson |
| 2,882,928 A | 4/1959 | Cogliati |
| 3,311,129 A | 3/1967 | Binder |
| 3,832,854 A | 9/1974 | Metts |
| 4,015,629 A | 4/1977 | Morgan et al. |
| 4,094,338 A | 6/1978 | Bauer |
| 4,224,156 A | 9/1980 | Pardikes et al. |
| 4,718,449 A | 1/1988 | Ralph |
| 4,802,592 A | 2/1989 | Wessels |
| 5,133,854 A | 7/1992 | Horvath |
| 5,498,348 A | 3/1996 | Plink |
| 5,820,751 A | 10/1998 | Faircloth, Jr. |
| 6,224,753 B1 | 5/2001 | Marbach |
| 6,238,577 B1 | 5/2001 | MacLaren |
| 6,997,644 B2 | 2/2006 | Fleeger |
| 7,125,200 B1 | 10/2006 | Fulton |
| 7,186,058 B2 | 3/2007 | Schulter |
| 7,429,147 B2 | 9/2008 | Marchetti |
| 7,762,741 B1 | 7/2010 | Moody |
| 7,985,035 B2 | 7/2011 | Moody |
| 8,043,026 B2 | 10/2011 | Moody |
| 2011/0176869 A1* | 7/2011 | Moody .................. E03F 5/107 405/96 |

* cited by examiner

*Primary Examiner* — Sean Andrish
(74) *Attorney, Agent, or Firm* — Larson & Larson P.A.; Frank Liebenow; Patrick Ried

(57) ABSTRACT

A flow control system for a body of water includes a floating portion that is covered by a shroud and includes a buoyant member. The floating portion has an inlet portion within the shroud and the inlet portion is suspended distal from the floating portion forming a gap. A stationary portion is interfaced to a containment surface of the body of water and is in fluid communication with a drainage system. An extendable member is interfaced to the inlet portion, fluidly interfacing an orifice of the inlet portion to the stationary portion, and therefore to the drainage system. When in use, fluid from below a surface of the body of water flows through the gap, into the orifice, through the extendable member, and out through the drainage system. The flow rate of the fluid is constant through a range of depths of the body of water.

17 Claims, 5 Drawing Sheets

SYSTEM, METHOD, AND APPARATUS FOR OPTIMIZING THE FLOW RATE THROUGH DETENTION AND SURGE FACILITIES

FIELD

This invention relates to the field of drainage and more particularly to a system for optimizing the flow rate through detention and surge facilities.

BACKGROUND

Detention and surge facilities temporarily store a fluid and limit the rate of fluid discharge to a downstream system when the inflow rate of the fluid is variable and at times exceeds the functional capacity of the downstream system. In the case of a storm water detention system, increased volumes of storm water runoff, typically generated by the development of upstream lands, flow into the system at varying rates and are temporarily stored for delayed release downstream to reduce incidences of flooding, harmful erosion, rapid fluctuations in water temperature and other environmental consequences which occur when receiving bodies of water such as lakes, rivers, streams and oceans receive flow at significantly increased rates. Similarly, a surge tank temporarily stores a process fluid of varying inflow rate and limits the rate of discharge of the fluid to that which will not exceed the capacity of a downstream process. In the field of wastewater treatment, a surge tank is sometimes deployed to receive wastewater flows during peak periods of water use. The surge tank temporarily stores the wastewater and limits the release of the wastewater flow to the treatment plant to a rate not exceeding the design capacity of the plant.

The temporary storage volume required for a detention system or surge tank is dependent on the rate and duration of fluid inflow and the allowable rate and duration of fluid outflow. The larger the difference between the peak rate of inflow and the allowable rate of outflow, the greater the volume is required for temporary storage.

Providing large storage volumes can be costly including, for example, the expense incurred for land acquisition and excavation required to construct a large detention pond or the expense of fabrication and installation of a very large tank. It is therefore advantageous to minimize the amount of temporary storage volume required. Minimization of the required temporary storage volume can be accomplished by minimizing the difference between the duration and rate of inflow and the duration and rate of outflow. Since the rate of inflow is variable and cannot be controlled, minimization of the required temporary storage volume is achieved when the maximum allowable rate of discharge is achieved at the earliest point in time following the commencement of inflow and is sustained for the longest possible duration of time.

The prior art is generally concerned with limiting the maximum outflow rates, at which damage can occur, by employing discharge control mechanisms such as fixed weirs, orifices, nozzles and riser structures whereby the maximum discharge rates of such mechanisms are determined by the geometric configuration of the mechanisms and the height of the fluid (static head) acting on the mechanisms. In each case, the maximum flow rate is achieved only at the single point in time at which the static head acting on the mechanism is at its maximum level. Therefore, all discharges occurring when fluid levels are not at their maximums are less than optimal.

One solution to this problem is described in U.S. Pat. No. 7,125,200 to Fulton, which is hereby incorporated by reference. This patent describes a flow control device that consists of a buoyant flow control module housing an orifice within an interior chamber that is maintained at a predetermined depth below the water surface. This flow control device neglects the use of other traditional flow control mechanisms such as weirs, risers and nozzles, has some adjustability, and utilizes flexible moving parts.

Stormwater runoff is often laden with a variety of pollutants from a variety of sources such as oils and greases from roadways and parking lots, nitrogen and phosphorous from agricultural and horticultural pursuits, heavy metals (e.g. lead, copper, zinc, chromium) from industrial activities, and suspended solids such as silt and clay particles which tend to erode at accelerated rates when lands are stripped of vegetation during construction activities. Because stormwater runoff is so often polluted, stormwater management systems typically include a component process called a Best Management Practice (BMP) which is intended to reduce the quantity of pollution discharged to receiving bodies of water such as lakes, rivers, streams and oceans. In the case of a stormwater detention system, the BMP component is most often located at the bottom of the system, below the volume of storage required to mitigate increased discharge rates which may cause flooding, erosion, rapid fluctuations in water temperature and other environmental consequences (the minimum elevation at which water may be released). One such BMP is known as retention, wherein a certain volume of stormwater runoff, often referred to as the "first flush" is collected and stored between the bottom elevation of the system and the minimum elevation at which water may be released. The "first flush" is typically disposed of through a combination of the processes of infiltration and evapotranspiration. Another such BMP is known as "extended detention", wherein the "first flush" of runoff is also collected and stored between the bottom of the system and the minimum elevation at which water may be released; however, the "first flush" is slowly drained to the receiving body of water over a predetermined period of time (typically 24 to 72 hours) allowing for physical, chemical and biological processes such as sedimentation, oxidation, precipitation, adsorption and denitrification to reduce the quantity of pollution contained in the discharge. In the stormwater treatment industry, the volume of the "first flush" is not uniformly defined and often varies geographically. The "first flush" volume is most often related to the depth of rainfall for events which recur annually at a frequency equal to the desired level of treatment. For example, in a certain geographic region, 95% of all storm events deliver a total rainfall depth of one inch or less. Therefore, if the volume of the "first flush" is treated with the BMP of retention and the volume treated is equivalent to the amount of runoff generated from the first inch of rainfall, then at least 95% of all pollution will be removed from the discharge on an annual average basis. Similarly, it follows that if a volume greater than the runoff generated by the first inch of rainfall is retained in the system, then more than 95% of all pollution will be removed from the discharge on an average annual basis. Likewise, in the same geographic region, if the volume of the "first flush" is treated with the BMP of "extended detention" and the "extended detention" process is known or presumed to remove 80% of the total mass of pollutants, than at least 76% (80%×95%=76%) of all pollution will be removed from the discharge on an annual average basis. Thus, greater masses of pollution can be removed from stormwater discharges if larger BMP volumes are provided in the stormwater management system.

What is needed is a flow control device that allows for greater BMP volumes of storm water to be accommodated in stormwater management systems which also provide a certain amount of storage volume above the BMP volume for the purposes of reducing incidences of flooding, harmful erosion, rapid fluctuations in temperature and other environmental consequences which result when a body of water such as a lake, river, stream or ocean receives increased volumes of stormwater discharges at increased rates of inflow.

SUMMARY

In one embodiment, a flow control system for a body of water is disclosed including a floating portion that is covered by a shroud and includes a buoyant member. The floating portion has an inlet portion within the shroud and the inlet portion is suspended distal from the floating portion forming a gap between the inlet portion and the floating portion. A stationary portion is interfaced to a containment surface of the detention pond/system (e.g., the floor or wall containing the body of water) and is in fluid communication with a drainage system. An extendable member is interfaced to the inlet portion, fluidly interfacing an orifice of the inlet portion to the stationary portion, and therefore to the drainage system. When in use, fluid from below the surface of the body of water flows under the lower edge of the shroud, through the gap, into the orifice, through the extendable member, and out through the drainage system. The flow rate of the fluid is constant through a range of depths of the body of water.

In another embodiment, a method of configuring a flow control system for a body of water is disclosed including providing a flow control system that has a floating portion that has a buoyant member and is covered by a shroud. The flow control system also has an inlet portion suspended by rods, wires, cables, ropes, string or other means, distal from the floating portion, which has an orifice. Calibrated cut lines are formed in the inlet portion for one means of adjusting the flow rate. At least one vent, extending above the water surface and connected to the inlet portion, fluidly couples ambient air pressure with the orifice. The flow control system has a stationary portion for interfacing to a containment surface of the detention pond/system (e.g., the floor or wall containing the body of water) and for connection to a drainage system. An extendable member has two ends, one end is interfaced to the inlet portion and a distal, second end is interfaced with the stationary portion. The extendable member is in fluid communication with the orifice of the inlet portion and with the drainage system. The method continues with selecting one of the calibrated cut lines based upon a desired flow rate and cutting the inlet portion along the selected, calibrated cut line. This opens the orifice to a pre-determined area. The inlet portion is then installed into the floating portion where it is suspended distal to the floating portion with rods, wires, cables, rope, string or other means and it is covered by the shroud. The method continues by adjusting the length of the rods, wires, cables, rope, string or other means such that the orifice area of the inlet portion is suspended distal from the floating portion at a depth below the water surface which when combined with the orifice area will deliver the desired flow rate.

In another embodiment, a flow control system for a body of water is disclosed including a floating portion that is covered by a shroud. The floating portion includes a buoyant member and an inlet portion, the inlet portion held within the shroud. The inlet portion is suspended distal from the floating portion forming a gap between the inlet portion and the floating portion and the inlet portion has a plurality of calibrated cut lines. A stationary portion is interfaced to a containment surface of the detention pond/system (e.g., the floor or wall containing the body of water) and is in fluid communication with a drainage system. An extendable member is interfaced to the inlet portion. The extendable member fluidly interfaces an orifice of the inlet portion to the stationary portion, and therefore to the drainage system. When in use, fluid from below the surface of the body of water flows through the gap and into the orifice and then flows through the extendable member and out through the drainage system. The flow rate of the fluid through the orifice is constant through a range of depths of the body of water and the flow rate is proportional to an area of the orifice and a depth of the orifice from the surface of the body of water.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
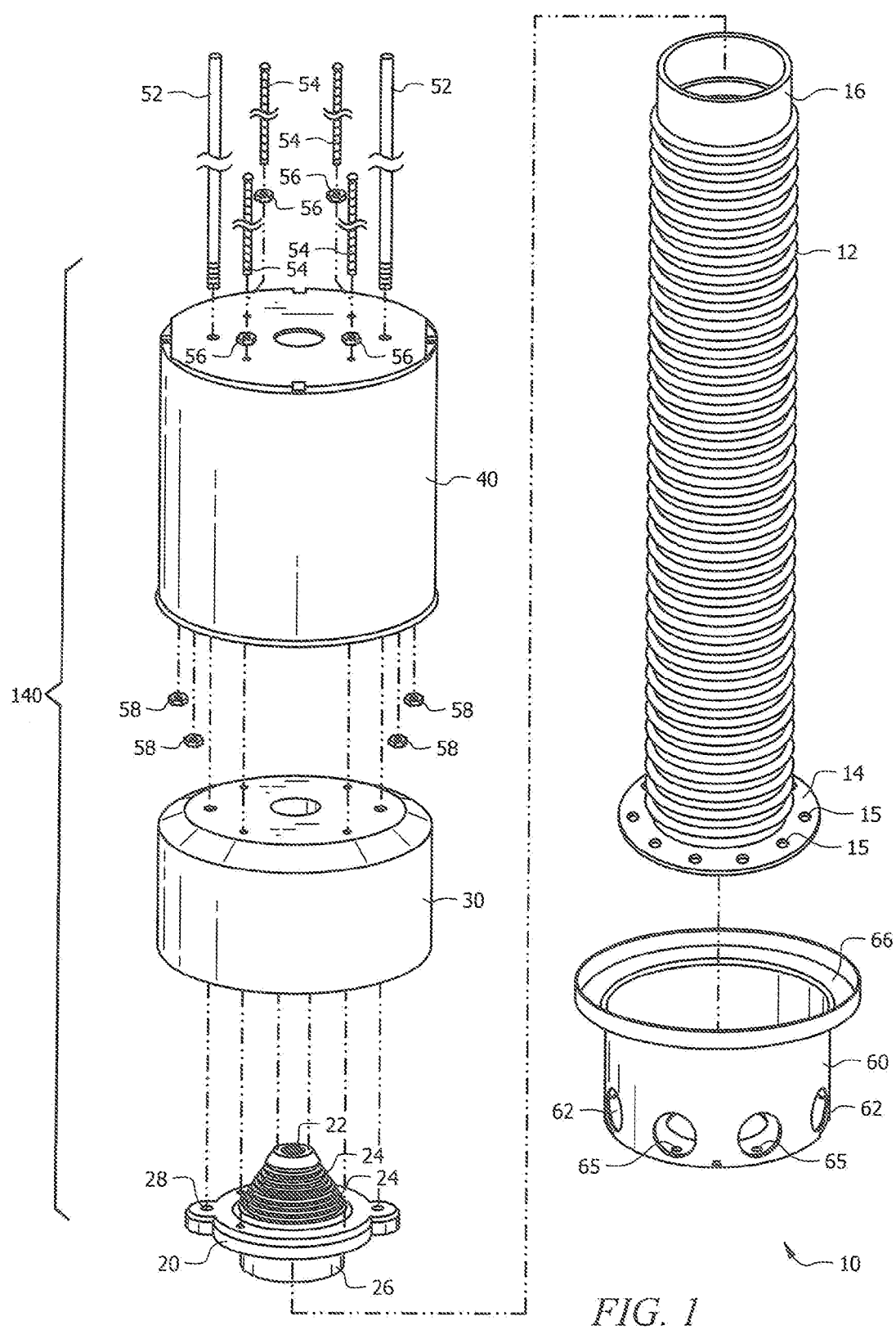
FIG. 1 illustrates an exploded view of a flow control system.

Reference will now be made in detail to the presently preferred embodiments of the invention, examples of which are illustrated in the accompanying drawings. Throughout the following detailed description, the same reference numerals refer to the same elements in all figures.

The flow control system described provides for an initial discharge rate starting as soon as the detention system or surge tank reaches a pre-determined liquid level, then, as the liquid level increases to the point at which the floating portion becomes buoyant, the discharge rate increases. Once the liquid level increases above the point at which the floating portion becomes buoyant, the discharge rate remains relatively constant. This controlled rate of discharge helps protect downstream drainage systems from erosion and flooding while reducing the total volume of detention storage required for the anticipated inflow and outflow rates.

Prior flow control systems limited the maximum outflow rates, at which damage can occur, by deploying discharge control mechanisms such as fixed weirs, orifices, nozzles and riser structures whereby the maximum discharge rates of such mechanisms are determined by the geometric configuration of the mechanisms and the height of the fluid or static head acting on the mechanisms. In each case, the maximum flow rate is achieved only at the single point in time at which the static head acting on the mechanism is at its maximum level. Therefore, all discharges occurring when fluid levels are not at their maximums are less than optimal and require provision of greater temporary storage capacities such as larger ponds. Note that any reference to water or storm water in this application includes all fluids and impurities carried by those fluids such as sand, silt, pollutants, nutrients, vegetative components (e.g., leaves), etc.

Figure 2:
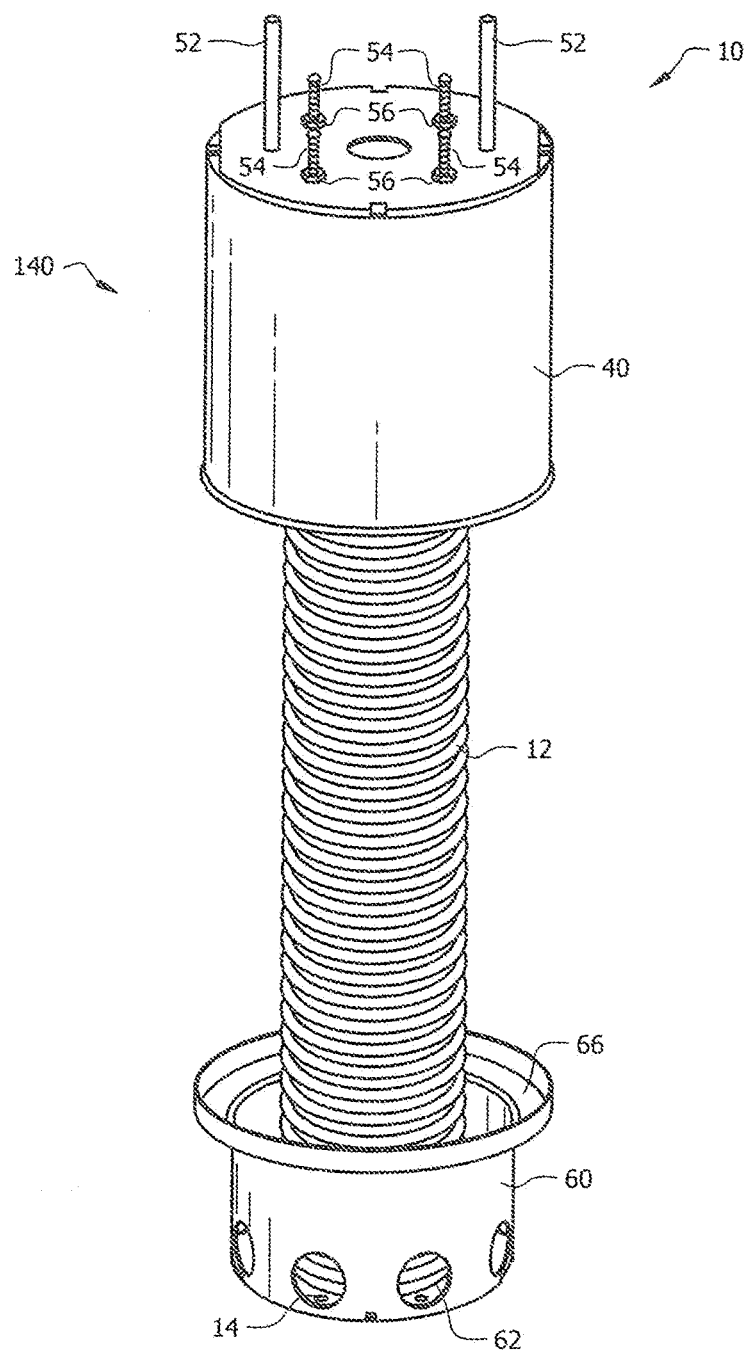
FIG. 2 illustrates a perspective view of the flow control system.

Referring to FIGS. 1 and 2, an exploded view and a perspective view of a flow control system 10 is shown. The flow control system 10 includes a floating portion 140, a fixed portion 60, and an extendable portion 12. The floating portion 140 ascends and descends with the level of water 7 (see FIGS. 3 and 4) in the detention system while the fixed portion 60 is connected to a drainage system 5 (see FIGS. 3 and 4) through which storm water from the detention system is directed. Between the floating portion 140 and the fixed portion 60 is an extendable portion 12 shown as an accordion-like member 12 (e.g., a bellows) that stretches or compresses depending upon the height of the floating portion 140 above the fixed portion 60, based upon the water level 7. It is anticipated that the extendable portion 12 is a bellows 12 that is reinforced by, in some embodiments, rings (e.g. steel, stainless steel, aluminum or carbon fiber composite—not shown) to prevent crushing from pressures exerted by the storm water in the detention system. In alternate embodiments, other types of extendable portions 12 are anticipated such as telescoping members (not shown).

The floating portion 140 includes a shroud 40, a buoyant member 30, and a field-configurable inlet portion 20. Fasteners 54/56/58 hold the buoyant member 30 at or near the top of the shroud 40, and the end of the fasteners thread through the field-configurable inlet portion 20, suspending the field-configurable inlet portion 20 at a distance from the bottom of the buoyant member 30, allowing the storm water to flow over the field-configurable inlet portion 20 and into the field-configurable inlet portion orifice 22. Note that in a preferred configuration, field adjustment cut lines or grooves 24 are formed/molded into the field-configurable inlet portion 20 as will be described later.

The base 26 of the field-configurable inlet portion 20 is affixed (e.g. by pressure, adhesive, ultrasonic welding, etc.) to a top flange 16 of the extendable portion 12 and the storm water entering the field-configurable inlet portion orifice 22 passes through the field-configurable inlet portion 20 and into the extendable portion. To prevent air pockets and vacuum within the extendable portion 12 (and drainage system 5), air vents 52 (e.g. hollow tubes) are connected to the field-configurable inlet portion 20 at ports 28 and the ports 28 are in fluid communications with the interior of the field-configurable inlet portion 20 through channels 29. Since the interior of the field-configurable inlet portion 20 is in fluid communications with the interior of the extendable portion 12, air pressure from above the surface of the water level 7 is allowed to equalize with the pressure within the extendable portion 12.

The fixed portion 60 is connected to the drain system 5 in any way known in the industry and the extendable portion 12 is connected to the fixed portion 60, also in any way known including adhesives, ultrasonic welding, pressure fits, and (as shown) a series of fasteners passing through holes 15 in the flange 14 and holes 65 in the fixed portion 60.

Figure 3:
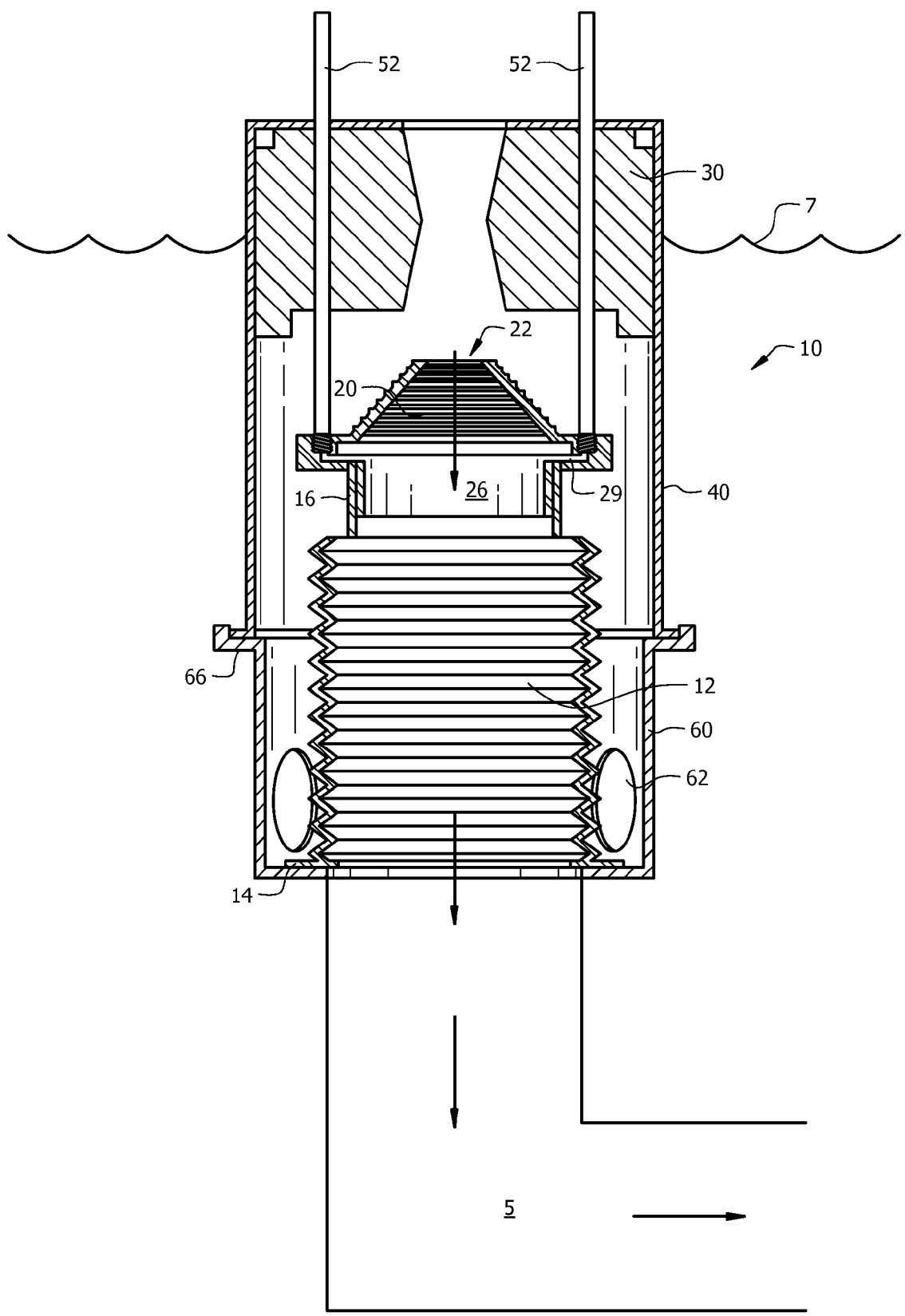
FIG. 3 illustrates a cut-away view of the flow control system at a low water level.

Holes 62 in the sides of the fixed portion 60 equalize pressure outside and inside of the shroud 40 and fixed portion 60 when the shroud 40 is seated on the fixed portion 60 as shown in FIG. 3.

Figure 4:
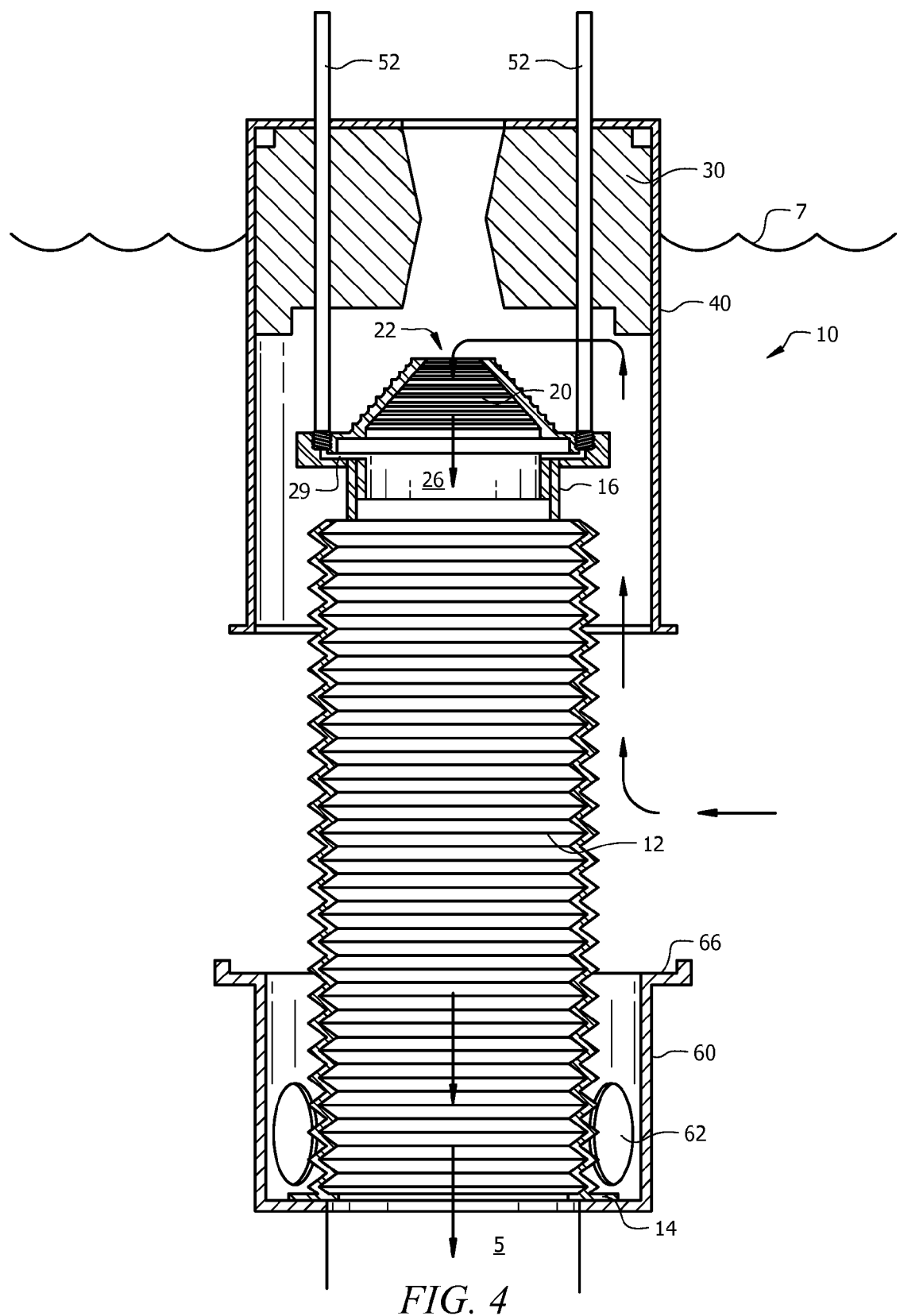
FIG. 4 illustrates a cut-away view of the flow control system at a higher water level.

Referring to FIGS. 3 and 4, cut-away view of the flow control system 10 at a low water level (FIG. 3) and a high water level (FIG. 4) are shown. In FIG. 3, the shroud 40 rests on the ledge 66 of the fixed portion 60. At this point, the flow rate is not constant and increases with rising water levels since the shroud 40 is not floating above the fixed portion 60. Water pressure is allowed to enter the fixed portion 60 through equalization holes 62 to reduce any pressure differential that would otherwise keep the shroud 40 from rising off of the ledge 66. As the water level 7 rises, the buoyant member 30 lifts the floating portion 140 as shown in FIG. 4 and water flows as shown in the arrows into the inlet portion orifice 22. The flow rate of storm water from the detention pond is proportional to the size of the inlet portion orifice and the fixed depth (which also may be adjusted with fasteners 54/56/58) of the inlet portion orifice 22 below the surface 7. Since both the size of the inlet portion orifice and the fixed depth of the inlet portion orifice 22 below the surface 7 are constant, the flow rate is constant until the extendable member 12 is extended so far that it resists being extended and the depth of the inlet portion orifice 22 below the surface 7 changes, thereby increasing the flow rate.

As the storm water from the detention pond flows through the inlet portion orifice 22, through the extendable member 12, and out the drain system 5, any vacuum or pressure that is created within the inlet portion orifice 22, the extendable member 12, and the drain system 5 is equalized with air pressure delivered through the vent tubes 52. Although two vent tubes 52 are shown, any number of vent tubes 52 is anticipated, including one vent tube 52.

Note that the shroud 40 prevents storm water from the surface 7 from entering directly into the inlet portion orifice 22. Therefore, the storm water is taken from a strata slightly below the surface 7, reducing the amount of floating debris such as leaves, twigs, paper, etc., that enter the inlet portion orifice 22, reducing transmittal of this debris to the drain system 5 and also reducing clogging of the inlet portion orifice 22.

Figure 5:
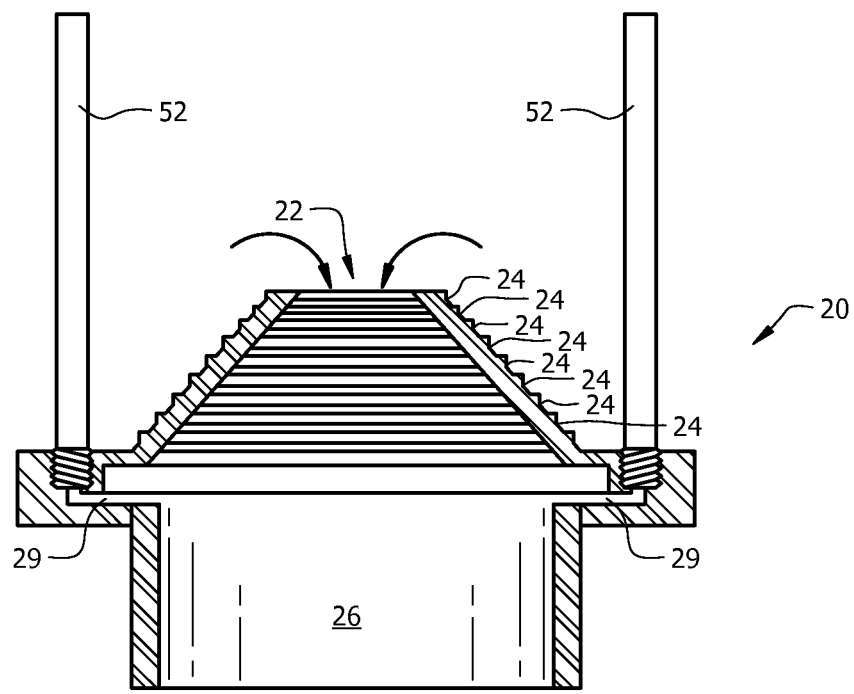
FIG. 5 illustrates a cut-away view of the inlet portion of the flow control system configured for a lower flow rate.
Figure 6:
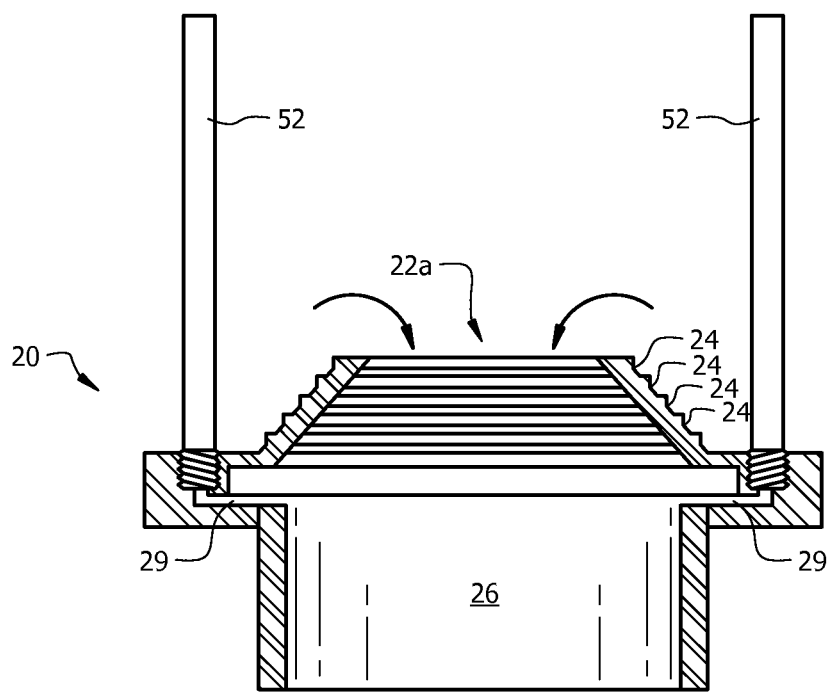
FIG. 6 illustrates a cut-away view of the inlet portion of the flow control system configured for a higher flow rate.

Referring to FIGS. 5 and 6, cut-away views of the head portion 20 of the flow control system are shown configured for a lower flow rate (FIG. 5) and for a higher flow rate (FIG. 6). As mentioned prior, the flow rate of storm water from the detention system into the drain system 5 is proportional to the size of the inlet portion orifice and the fixed depth of the inlet portion orifice 22 below the surface 7. The fixed depth of the inlet portion orifice 22 below the surface 7 is constant and adjustable by the fasteners 54/56/58. Since detention system sizes, predicted runoff conditions, drainage capabilities, and local storm water control regulations vary, it is anticipated that flow rate requirements will vary from installation to installation. One way to accommodate a range of required flow rates is to have multiple different inlet portions 20, each having different inlet portion orifice 22 sizes. Having such will create a stocking and cost issue. Instead, a set of calibrated cut lines 24 are made/formed/molded in the inlet portion 20. With such, the inlet portion orifice 22 is adjusted by using a cutting device to cut around one of the calibrated cut lines 24, creating an inlet portion orifice 22 that yields the desired flow rate. The larger the inlet portion orifice 22, the greater the flow rate. Again, since after cutting, the size of the inlet portion orifice 22 is constant and the fixed depth of the inlet portion orifice 22 below the surface 7 is constant, thereto the flow rate is constant throughout the operational range of the extendable portion 12.

This adjustment is shown in FIGS. 5 and 6. In FIG. 5, no cut has been made and the default inlet portion orifice 22 determines the flow rate. In FIG. 6, a cut has been made, and the inlet portion orifice 22A is larger than the default inlet portion orifice 22, hence a greater, yet still constant flow rate is produced.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A flow control system for a body of water, the flow control system comprising:
   a floating portion, the floating portion covered by a shroud, the floating portion having a buoyant member, the floating portion having an inlet portion within the shroud, the inlet portion suspended distal from the floating portion forming a gap between the inlet portion and the floating portion;
   a stationary portion, the stationary portion interfaced to a containment surface of the body of water and the stationary portion in fluid communication with a drainage system;
   an extendable member, the extendable member interfaced to the inlet portion, and the extendable member fluidly interfacing an orifice of the inlet portion to the stationary portion, and therefore to the drainage system;
   whereas when in use, fluid from below a containment surface of the body of water flows through the gap and into the orifice and flows through the extendable member and out through the drainage system;
   whereas a flow rate of the fluid through the orifice is constant through a range of depths of the body of water; and
   wherein the flow rate is field adjustable by cutting the inlet portion along a selected calibrated cut line of a plurality of calibrated cut lines.

2. The flow control system of claim 1, wherein the flow rate is proportional to an area of the orifice and a depth of the orifice from the surface.

3. The flow control system of claim 1, further comprising at least one vent, each of the at least one vent fluidly coupling an atmosphere above the floating portion with the extendable member.

4. The flow control system of claim 1, wherein the stationary portion has a ledge on which the shroud rests when the surface of the body of water is below a specific depth.

5. The flow control system of claim 1, wherein the extendable member is a bellows.

6. The flow control system of claim 5, wherein the bellows is reinforced with a plurality of rings, thereby preventing crushing of the bellows by pressure of the fluid.

7. A method of configuring a flow control system for a body of water, the method comprising:
   providing a flow control system comprising:
      a floating portion, the floating portion covered by a shroud, the floating portion having a buoyant member;
      an inlet portion having an orifice, the inlet portion having a plurality of calibrated cut lines;
      at least one air vent, each of the at least one air vent fluidly coupled between the inlet portion and an atmosphere above the body of water;
      a stationary portion, the stationary portion for interfacing to a containment surface of the body of water and the stationary portion for connection to a drainage system;
      an extendable member, the extendable member, one end of the extendable member interfaced to the inlet portion and a distal second end of the extendable member interfaced with the stationary portion, the extendable member in fluid communication with the orifice of the inlet portion and with the drainage system;
   selecting one of the plurality of calibrated cut lines based upon a desired flow rate;
   cutting the inlet portion along the one of the calibrated cut lines, thereby opening the orifice to a pre-determined area; and
   installing the inlet portion into the shroud;
   connecting the inlet portion to the shroud with fasteners;
   adjusting a distance between the inlet portion and the water surface with the fasteners to suspend the inlet portion at a depth required to produce the desired flow rate for the orifice area selected by cutting the inlet portion along one of the calibrated cut lines.

8. The method of claim 7, wherein the extendable member is a bellows.

9. The method of claim 8, wherein the bellows is reinforced with a plurality of rings, thereby preventing crushing of the bellows by pressure of the fluid.

10. The method of claim 7, further comprising the steps of:
    mounting the stationary portion to a containment surface of the body of water and connecting the stationary portion to the drainage system.

11. A flow control system for a body of water, the flow control system comprising:
    a floating portion, the floating portion covered by a shroud, the floating portion having a buoyant member, the floating portion having an inlet portion within the shroud, the inlet portion suspended distal from the floating portion forming a gap between the inlet portion and the floating portion, the inlet portion having a plurality of calibrated cut lines;
    a stationary portion, the stationary portion interfaced to a containment surface of the body of water and the stationary portion in fluid communication with a drainage system;
    an extendable member, the extendable member interfaced to the inlet portion, and the extendable member fluidly interfacing an orifice of the inlet portion to the stationary portion, and therefore to the drainage system;
    whereas when in use, fluid from below a surface of the body of water flows through the gap and into the orifice and flows through the extendable member and out through the drainage system;
    whereas a flow rate of the fluid through the orifice is constant through a range of depths of the body of water and the flow rate is proportional to an area of the orifice and a depth of the orifice from the surface; and
    wherein the stationary portion has a ledge on which the shroud rests when the surface of the body of water is below a specific depth.

12. The flow control system of claim 11, wherein the flow rate is field adjustable by cutting the inlet portion along a selected calibrated cut line of the plurality of calibrated cut lines.

13. The flow control system of claim 11, further comprising at least one vent, each of the at least one vent fluidly coupling an atmosphere above the floating portion with the extendable member.

14. The flow control system of claim 11, wherein the extendable member is a bellows.

15. The flow control system of claim 14, wherein the bellows is reinforced with a plurality of rings, thereby preventing crushing of the bellows by pressure of the fluid.

16. The flow control system of claim 11, wherein the buoyant member is mounted within the shroud.

17. The flow control system of claim 11, wherein the buoyant member and the inlet portion are affixed to the shroud with a plurality of fasteners, the fasteners holding the buoyant member against a planar surface of the shroud and the fasteners holding the inlet portion at a distance from the bottom of the buoyant member, thereby enabling flow of fluid around the inlet portion and into the orifice.

* * * * *